US00RE39303E

(19) United States
(12) Reissued Patent
Sklar et al.

(10) Patent Number: US RE39,303 E
(45) Date of Reissued Patent: Sep. 19, 2006

(54) DISTRIBUTION OF A LARGE NUMBER OF LIVE TELEVISION PROGRAMS TO INDIVIDUAL PASSENGERS IN AN AIRCRAFT

(75) Inventors: Richard E. Sklar, Huntington Beach, CA (US); Lawrence E. Girard, Huntington Beach, CA (US); Ralph P. Phillipp, Huntington Beach, CA (US)

(73) Assignee: Rockwell Collins, Cedar Rapids, IA (US)

(21) Appl. No.: 09/584,477

(22) Filed: Jun. 1, 2000

Related U.S. Patent Documents

Reissue of:
(64) Patent No.: 5,760,819
Issued: Jun. 2, 1998
Appl. No.: 08/667,225
Filed: Jun. 19, 1996

(51) Int. Cl.
*H04N 7/18* (2006.01)

(52) U.S. Cl. ..... 725/76; 725/72; 725/69; 342/363; 343/757

(58) Field of Classification Search ..... 725/76, 725/77, 75, 74, 78, 87, 91, 114
See application file for complete search history.

(56) References Cited

U.S. PATENT DOCUMENTS

| | | | | | |
|---|---|---|---|---|---|
| 4,866,515 | A | * | 9/1989 | Tagawa et al. | 455/6.3 |
| 5,146,234 | A | * | 9/1992 | Lalezari | 343/895 |
| 5,289,272 | A | * | 2/1994 | Rabowsky et al. | 348/8 |
| 5,463,656 | A | * | 10/1995 | Polivka et al. | 375/200 |
| 5,495,258 | A | * | 2/1996 | Muhlhauser et al. | 343/753 |
| 5,524,272 | A | * | 6/1996 | Podowski et al. | 455/3.2 |
| 5,555,466 | A | * | 9/1996 | Scribner et al. | 348/8 |
| 5,568,484 | A | * | 10/1996 | Margis | 370/85.5 |
| 5,678,171 | A | * | 10/1997 | Toyama et al. | 725/76 |

FOREIGN PATENT DOCUMENTS

EP 570198 A2 * 11/1993

OTHER PUBLICATIONS

Jim Williams, "Airborne Satellite Television", Avion Magazine, Fourth Quarter, 1994, pp. 43–45, 48, 50–52, 54.

Jim Williams, "MPEG—The Great Enabler", Avion Magazine, Fourth Quarter, 1994, pp. 48, 50–52, 54.

* cited by examiner

*Primary Examiner*—Chris Grant
(74) *Attorney, Agent, or Firm*—Nathan O. Jensen; Kyle Eppele

(57) ABSTRACT

A satellite television system that provides live television programming to passengers by integrating direct broadcast satellite services into an in-flight aircraft entertainment system. The system has an antenna disposed on the aircraft that is pointed at a plurality of satellites that are part of a direct broadcast satellite system. The antenna is controlled by an antenna controller and antenna interface unit that send control signals and process status signals to steer the antenna. The antenna is steered to lock it onto RF signals transmitted by the satellites. The antenna interface unit downconverts the received encoded RF signals to provide encoded left hand circularly polarized RF signals and right hand circularly polarized RF signals that contain different sets of television channels. The downconverted encoded RF signals are processed by a receiver to provide encoded video and audio signals of different television channels. The receiver does not decode or D/A convert the downconverted signals. The encoded video and audio signals containing the plurality of channels are modulated in a modulator, which also is used as a combiner to modulate signals derived from other video and audio sources. The modulated and encoded video and audio signals are routed to a video and audio distribution system which distributes the encoded video and audio signals to each passenger's seat. Seat electronics circuitry is located at each passenger's seat that contains a demodulator, decoder, digital to analog converters, and an optional tuner. The seat electronics circuitry demodulates, decodes and D/A converts the modulated and encoded video and audio signals into signals that may be viewed and heard by the passenger at that seat.

3 Claims, 3 Drawing Sheets

DISTRIBUTION OF A LARGE NUMBER OF LIVE TELEVISION PROGRAMS TO INDIVIDUAL PASSENGERS IN AN AIRCRAFT

Matter enclosed in heavy brackets [ ] appears in the original patent but forms no part of this reissue specification; matter printed in italics indicates the additions made by reissue.

BACKGROUND

The present invention relates generally to in-flight aircraft entertainment systems, and more particularly, to a satellite television system that distributes a large number of live television programs to passengers of an aircraft by way of direct broadcast satellite.

The assignee of the present invention manufactures in-flight aircraft entertainment systems, such as an APAX-150 digital passenger entertainment system, for example. The APAX-150 system, along with other commercially available systems, distributes audio and video material to passengers derived from a variety of sources. For example, existing aircraft passenger entertainment systems provide passengers with audio generated from audio tape players, movies derived from video tape players, and interactive services such as games, shopping and telecommunications. With the exception of telecommunication services (air-to-ground telephone calls, etc), all existing services utilize on-board sources (tape players, etc.) to provide the viewable content.

According to polls of airline passengers, there is strong interest in live television programming as an entertainment option. This may include news, sporting events, movies and regular commercial programming. Up to now, each airplane has been a closed, self-contained content provider, in the sense that once off the ground, all entertainment is generated from within the aircraft. This has precluded the offering of live television. Now, with the advance in live broadcast satellite technology, it is possible to provide this desired service to the flying passenger.

An article was published by Jim C. Williams entitled "Airborne Satellite Television" published in the Fourth Quarter 1994 issue of Avion magazine at pages 43 54 that generally describes the concepts of the present invention. Another article in the same magazine entitled "MPEG The Great Enabler" describes MPEG compression technology which is used in the DirectTV digital broadcast satellite system to transmit multiple video and audio channels from a ground station to satellite transponders which relay them to ground-based receivers where they are decoded and displayed. These articles are incorporated herein by reference in their entirety.

The articles provide a description of the digital broadcast satellite system and its operation. The "Airborne Satellite Television" article also describes adapting the digital broadcast satellite system to provide live television broadcasts to aircraft. However, while a description is provided regarding a possible system that could be implemented and the problems that needed to be overcome to implement such a system were discussed, no details of an actual system were provided, such as system or component block diagrams, for example. In fact, the article states that a working system was to be developed in the future. The present invention is such a system.

Accordingly, it is an objective of the present invention to provide for a satellite television system that distributes a large number of live television programs to passengers of an aircraft by way of direct broadcast satellite.

SUMMARY OF THE INVENTION

To meet the above and other objectives, the present invention is a satellite television system that provides live television programming to passengers using direct broadcast satellite (DBS) services. The present invention combines direct broadcast satellite and audio and video entertainment technologies to provide aircraft passengers with live in-flight television programming. Copending patent application Ser. No. 08/667,222, filed Jun. 19, 1996, entitled "Airborne Satellite Television System" assigned to the assignee of the present invention, describes systems that provide live television programming derived from a direct broadcast satellite system to a passenger aircraft.

The present invention extends the technology disclosed in this copending application to provide distribution of the live television programming within an aircraft to each passenger seat, where each passenger may individually select from among many (approximately 150) channels. Unlike a home environment, where a single person may select from all available programs while viewing only one at a time, the aircraft environment is similar to a large group of individual homes, where each person has a system. Including antenna and decoder. In the aircraft, however, it is not practical to duplicate these elements for each passenger. The present invention addresses this problem.

Passengers are desirous of having live television available at their seat. Also, they would like to select from a large number of television programs. A low-cost system described in the above-identified copending patent application, is not suitable for distributing multiple channels to each passenger because the receiver/decoder of this system contains a single circuit to receive and process a single television channel. That system, while suitable for distributing a single channel to a low-cost overhead monitor system, would require as many of these circuits as there are channels to be made available, which are approximately 150 in the case of the DirectTV system. In addition, the video and audio outputs of each of these multitude of circuits would have to be distributed to the passengers individually, a task not practical given the limited bandwidth of the distribution systems installed in commercial aircraft for this purpose.

The present invention provides for a satellite television system that distributes live television service to each passenger without the need to duplicate all of the receiver circuitry. Furthermore, the present invention distributes all television channels of the direct broadcast satellite system to each passenger using currently available aircraft entertainment distribution systems.

More specifically, the satellite television system comprises an antenna that is disposed on the aircraft and pointed at a plurality of satellites that are part of a direct broadcast satellite system. The antenna is controlled by an antenna controller and antenna interface unit that send control signals and process status signals to steer the antenna. The antenna is steered so that it is locked onto RF signals transmitted by the satellites. The antenna interface unit downconverts the received RF signals to provide left hand circularly polarized RF signals and right hand circularly polarized RF signals that contain different sets of television channels. The downconverted RF signals are processed by a single receiver to provide encoded video and audio signals comprising a plurality of television channels. The receiver does not decode or D/A convert the downconverted signals.

The encoded video and audio signals containing the plurality of channels are modulated in a modulator, which also is used as a combiner to modulate signals derived from other video and audio sources, such as video and audio tape players. The modulated and encoded video and audio signals containing the plurality of channels are routed to a video and audio distribution system that distributes the encoded video and audio signals to each passenger's seat. Seat electronics circuitry is located at each passenger's seat that contains a demodulator, decoder, digital to analog converter and a tuner. The seat electronics circuitry demodulates, decodes and A/D converts the modulated and encoded video and audio signals into signals that may be viewed and heard by the passenger at that seat.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
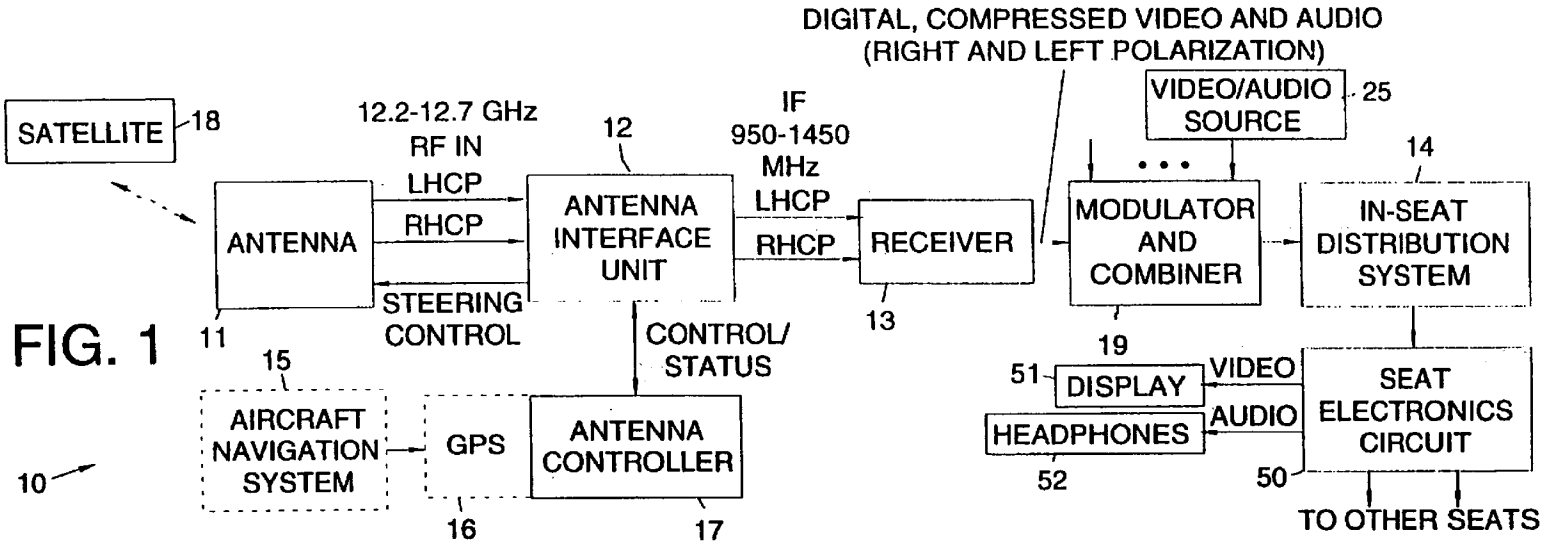
FIG. 1 is a top level block diagram of an embodiment of a satellite television system in accordance with the principles of the present invention that provides live in flight television programming to each passenger on an aircraft.

Referring to the drawing figures, FIG. 1 shows a top level block diagram of a satellite television system 10 in accordance with the principles of the present invention. The satellite television system 10 provides live television programming to individual seats of passengers on an aircraft and permits individual selection of channels by passengers.

The satellite television system 10 comprises an antenna 11 that is disposed adjacent the surface of the aircraft. The antenna 11 is pointed at satellites 18, such as DirectTV satellites 18, for example, that are part of the existing DirectTV direct broadcast satellite (DBS) system. The antenna 11 is steered so that it is locked onto the RF signal transmitted by the satellite 18. The antenna 11 is controlled by an antenna controller 17 that sends control signals and processes status signals to and from the antenna 11 by way of an antenna interface unit 12. However, it is to be understood that the antenna 11 may be an electronically steered antenna 11 or a mechanically steered antenna 11. The antenna interface unit 12 downconverts received MPEG encoded (compressed) RF signals to provide left hand circularly polarized RF signals and right hand circularly polarized RF signals that contain different sets of ended television channels. The received encoded (compressed) RF signals are in the 12.2–12.7 GHz band which are downconverted to IF signals in the 950–1450 MHz band.

The downconverted encoded IF signals are processed by a receiver 13, which does not decode or D/A convert them, to produce encoded video and audio signals corresponding to a plurality of encoded television channels. The encoded (compressed) video and audio signals are modulated by a modulator 19, which also is used as a combiner, to modulate signals derived from other video and audio sources, such as video and audio tape players. The modulated and encoded video and audio signals are then routed to an in-seat video and audio distribution system 14 which distributes them to each passenger's seat.

Seat electronics circuitry 50 is located at each passenger's seat that contains a demodulator 53. MPEG decoder 54 and digital to analog converters 55 (described in detail with reference to FIG. 5). The seat electronics circuitry 50 demodulates, decodes and converts the modulated and encoded video and audio signals into signals that may be viewed and heard by the passenger at that seat by way of a display 51 and head phones 52. A tuner 57 and game hardware 58 may be provided as part of the seat electronics circuitry 50.

In operation, the receiver serves to receive IF signal from the antenna 11, but does not provide MPEG decoding or digital-to-analog conversion processes. The output of the receiver 13, rather than a baseband video and analog audio output representing a single television program, includes of two serial data streams, one for each polarization. These MPEG-encoded data streams include all of the live television programming provided by the satellites 18.

The encoded data streams are applied to the RF modulator 19 along with signals from other entertainment sources such as video and audio regarding safety announcements or digital game data, for example. All of these signals are separately modulated and combined onto a single carrier. The resulting signal is distributed to the passengers by means of the in-seat video and audio distribution system 14, which may be an APAX-150 distribution system made by Hughes-Avicom International, for example.

At each passenger seat or seat group, the signal is processed by the seat electronics circuitry 50 wherein it is demodulated and processed appropriately according to individual signal type. For example, the baseband video and audio from video tape players may be applied to a tuner 57 and converted to a form appropriate for use by the seat's display 51 and the passenger's headphones 52. Game data is properly processed and applied to game hardware 58 to allow its use by the passenger. In the case of MPEG-encoded live television data streams, the subject of the present invention, the MPEG decoder 54 and digital-to-analog converters 55 located within the seat electronics circuitry 50 process the signals and generate baseband video and analog audio for use by the passengers. Since all television channels received from the satellites 18 are contained within the data streams, each passenger can select any particular channel, without affecting other passengers.

Figure 2:
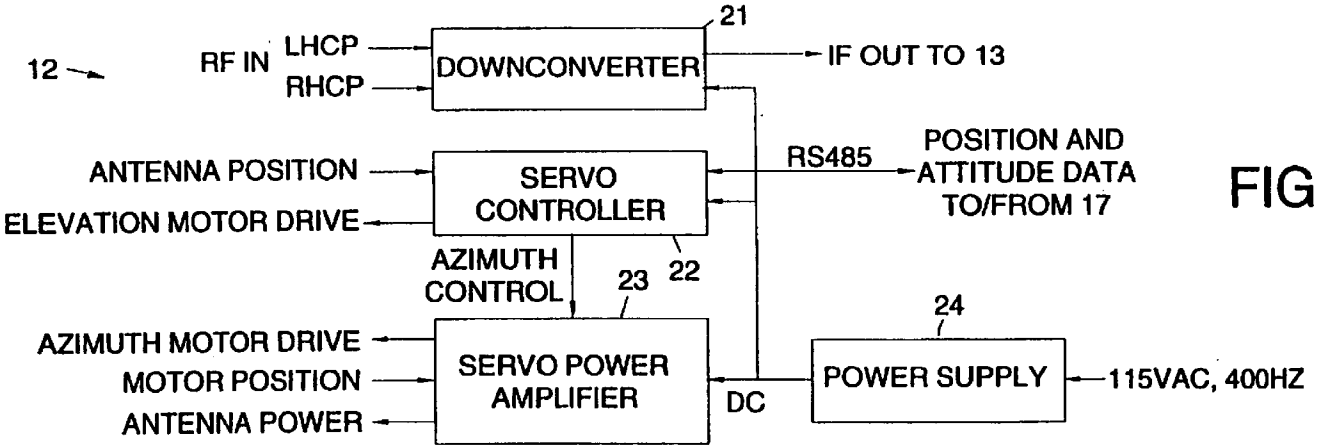
FIG. 2 is a block diagram of an antenna interface unit employed in the system of FIG. 1.

Referring to FIG. 2, it shows a block diagram of one embodiment of the antenna interface unit 12 employed in the system 10 of FIG. 1. The antenna interface unit 12 comprises a downconverter 21 that downconverts the RF signals from the 12.2–12.7 GHz band to the 950–1450 MHz band which are output to the receiver 13. A servo controller 22 is coupled between the antenna controller 17 and the antenna 11. The servo controller 22 processes antenna position signals to generate elevation motor drive signals that are supplied to the antenna 11. The servo controller 22 also outputs azimuth control signals to a servo power amplifier 23 that generates azimuth motor drive signals that are supplied to the antenna 11. Motor position control signals are fed from the antenna 11 to the servo power amplifier 23. Power is supplied to the antenna 11 by the servo power amplifier 23. A power supply 24 is provided that converts 115 volt AC power into appropriate DC voltages for the downconverter 21, the servo controller 22 and the servo power amplifier 23.

Figure 3:
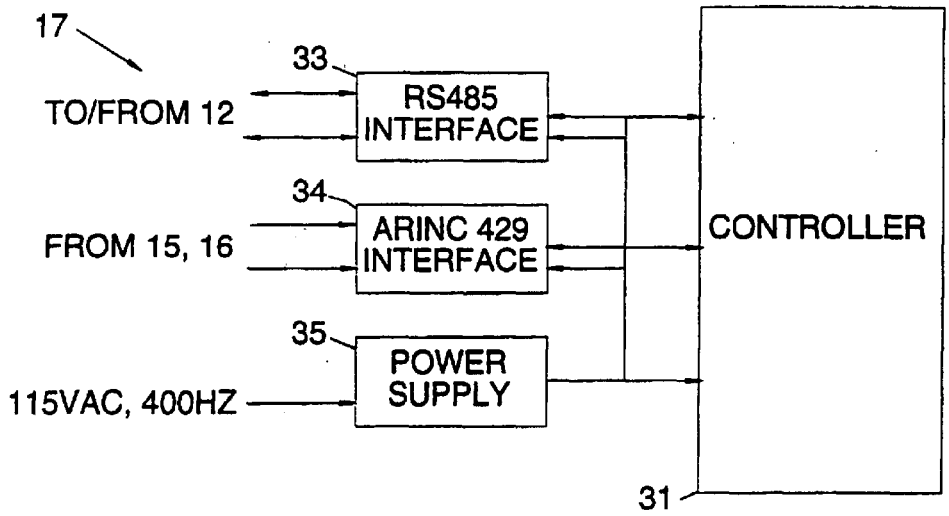
FIG. 3 is a block diagram of an antenna controller employed in the system of FIG. 1.

Referring to FIG. 3, it shows a block diagram of one embodiment of the antenna controller 17 employed in the system of FIG. 1. The antenna controller 17 comprises a controller 31 which is coupled to an RS485 interface 33 and an ARINC 429 interface 34. A power supply 35 is provided that converts 115 volt AC power into appropriate DC voltages for the controller 31, the RS485 interface 33, and the ARINC 429 interface 34. The controller 31 may be an Intel 486 processor, for example. The RS485 interface 33 is coupled between the antenna interface unit 12 and the controller 31 and couples control and status signals thereto. The ARINC 429 interface 34 is coupled between the aircraft navigation system 15 or global positioning system (GPS) 16 and the controller 31 and couples inertial reference signals thereto which is used to accurately steer the antenna 11 toward the satellite 18.

Figure 4:
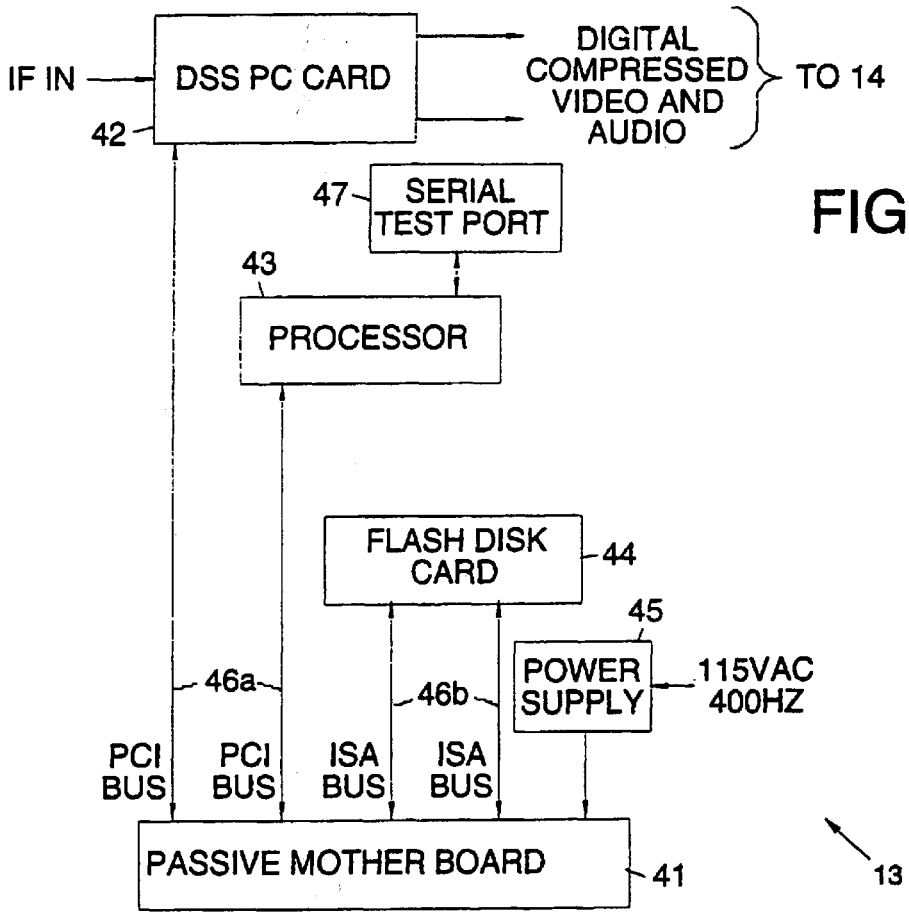
FIG. 4 is a block diagram of a receiver employed in the system of FIG. 1.

Referring to FIG. 4, it shows a block diagram of an embodiment of the receiver 13 employed in the system 10 of FIG. 1. The receiver 13 comprises a passive mother board 41 which has PCI and ISA busses 46a, 46b. A DSS PC card 42, for example, available from Hughes Network Systems and a computer processor 43 are coupled to the PCI bus 46a. The DSS PC card 42 and the computer processor 43 contain electronics and software that are substantially identical to a receiver that is used in commercially available DSS systems, such as those made by RCA, for example. Thus, the DSS PC card 42 and the computer processor 43 perform the functions of the receiver 13. The computer processor 43 has a serial test port 47 that may be used to test the processor 43 and DSS PC card 42. A flash disk card 44 is coupled to the ISA bus 46b and is used to store data and code in a manner similar to a hard disk. A power supply 45 is coupled to the passive mother board 41 and is used to convert 115 volt AC power into appropriate DC voltages for the DSS PC card 42, the computer processor 43, and the flash disk card 44.

Figure 5:
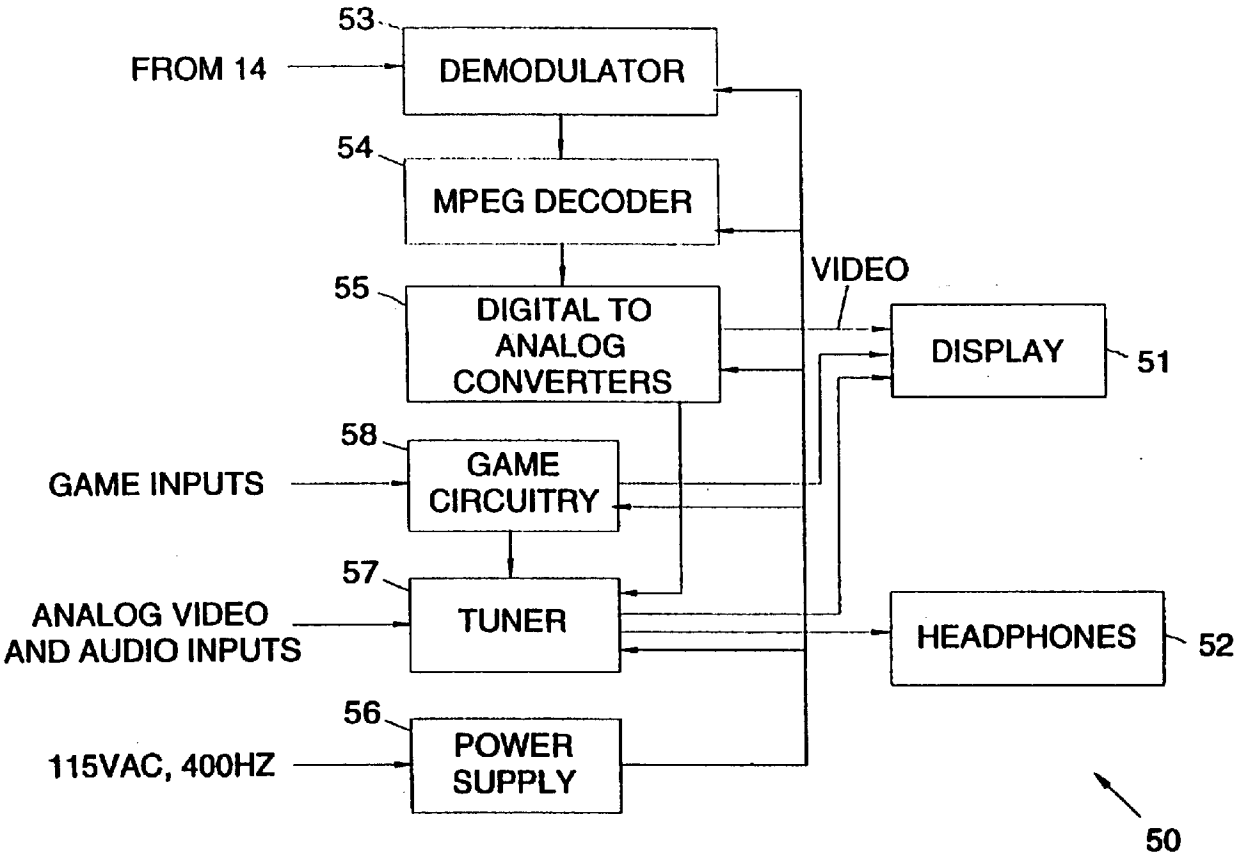
FIG. 5 is a block diagram of seat electronics circuitry employed in the system of FIG. 1.

Referring to FIG. 5, it shows a block diagram of one embodiment of the seat electronics circuitry 50 located at each passenger's seat. The seat electronics circuitry 50 includes an MPEG decoder 54, a demodulator 53, digital to analog converters 55, and optional tuner 57 and game electronics circuitry 58. A power supply 56 is provided that converts 115 volt AC power into appropriate DC voltages for the demodulator 53, the MPEG decoder 54, the digital to analog converters 55, the tuner 57 and the game electronics circuitry 58. The seat electronics circuitry 50 demodulates, decodes and converts the modulated and encoded video and audio signals into signals that are viewed and heard by the passenger at that seat by way of the display 51 and the headphones 52.

Thus, a satellite television system that distributes a large number of live television programs to passengers of an aircraft by way of direct broadcast satellite has been disclosed.

Furthermore the present invention also provides for a method of distributing a large number of television programs derived from satellites of a direct broadcast satellite system to each passenger on an aircraft. This is self-evident from, and readily understandable by, those skilled in the art from a reading of the present specification.

It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

[1. A satellite television system that provides a large number of television channels to each passenger on an aircraft derived from direct broadcast satellites, said system comprising:

an antenna that comprises steering means for steering the antenna toward the satellite in response to control signals supplied thereto;

antenna control means for providing the control signals to the antenna and for processing status signals derived from the antenna to steer the antenna so that it is locked onto encoded RF signals transmitted by the satellite, and for downconverting the encoded RF signals to provide encoded left hand and right hand circularly polarized RF signals that correspond to a plurality of encoded television channels;

a receiver coupled to the antenna control means for processing the downconverted encoded RF signals to provide encoded video and audio output signals corresponding to the plurality of television channels, and for feeding back the status signals to the antenna control means which are used to steer the antenna to lock it onto the RF signal received from the satellite;

a modulator coupled to the receiver for modulating the encoded video and audio signals;

a video and audio distribution system coupled to the modulator for distributing the modulated and encoded video and audio signals to each passenger's seat;

seat electronics circuitry coupled to the video and audio distribution system that comprises a demodulator, a decoder and digital to analog converters, and a tuner, for demodulating, decoding and D/A converting the modulated and encoded video and audio signals into signals that may be viewed and heard by a passenger at a seat by way of a display and headphones.]

[2. The system of claim 1 wherein the modulator comprises a combiner to modulate signals derived from additional video and audio sources.]

[3. The system of claim 1 wherein the seat electronics circuitry further comprises game electronics for displaying games on the display.]

[4. The system of claim 1 wherein the antenna control means comprises:

an antenna controller coupled to the receiver for processing status signals derived therefrom; and an antenna interface unit coupled between the antenna and the receiver for downconverting the RF signals to provide the left hand and right hand circularly polarized RF signals that contain different sets of television channels, and coupled between the antenna controller and the antenna for coupling the control and status signals therebetween.]

[5. The system of claim 4 wherein the antenna controller comprises:

a controller;

an RS485 interface coupled between the controller and the antenna interface unit for coupling the control and status signals to the controller; and an ARINC 429 interface coupled between the controller and a navigation system for coupling inertial reference signals provided by the navigation system to the controller which are used to generate steering signals that steer the antenna toward the satellite.]

[6. The system of claim 5 wherein the antenna interface unit comprises:

a downconverter for downconverting the RF signals received from the antenna and for outputting the downconverted RF signals to the receiver;

a servo controller coupled between the RS485 interface of the antenna controller and the antenna for processing antenna position signals to generate elevation motor drive signals that are supplied to the antenna, and for outputting azimuth control signals;

a servo power amplifier coupled between the servo controller and the antenna for supplying power to the antenna, and for processing motor position control signals derived from the antenna and the azimuth control signals derived from the servo controller to generate azimuth motor drive signals that are supplied to the antenna.]

[7. The system of claim 1 wherein the receiver comprises:

a passive mother board having first and second computer busses;

a receiver card coupled to the first computer bus;

a computer processor coupled to the first computer bus; and a flash disk card coupled to the second bus for storing video, audio and control signals.]

[8. A method of providing a large number of television channels derived from satellites of a direct broadcast satellite system to each passenger on an aircraft, said method comprising the steps of:

steering an antenna toward the satellites;

downconverting encoded RF signals transmitted by the satellites to provide encoded left hand and right hand circularly polarized RF signals that correspond to a plurality of encoded television channels;

processing the downconverted encoded RF signals to provide encoded video and audio output signals corresponding to the plurality of television channels;

modulating the encoded video and audio signals;

distributing the modulated and encoded video and audio signals to each passenger's seat using a video and audio distribution system;

receiving the modulated and encoded video and audio signals at seat electronics circuitry;

demodulating, decoding and D/A converting the modulated and encoded video and audio signals into signals that may be viewed and heard by a passenger at a seat by way of a display and headphones.]

[9. The method of claim 8 which further comprises the step of:

generating signals derived from the downconverted encoded RF signals to steer the antenna and lock it onto the RF signals received from the satellites.]

*10. A satellite television system that provides television channels to each passenger on an aircraft derived from at least one satellite, said system comprising:*

*(a) an antenna that comprises a steering device for steering the antenna toward the at least one satellite in response to control signals supplied thereto;*

*(b) an antenna controller to provide the control signals to the antenna and for processing status signals derived from the antenna to steer the antenna so that the antenna is locked onto encoded RF signals transmitted by the satellite, and for downconverting the encoded RF signals to provide downconverted RF signals that correspond to encoded television channels;*

*(c) a receiver coupled to the antenna controller to process the downconverted RF signals to obtain encoded output signals corresponding to the television channels;*

*(d) a modulator coupled to the receiver for modulating the encoded output signals to provide modulated and encoded signals;*

*(e) a distribution system coupled to the modulator for distributing the modulated and encoded signals to each passenger's seat; and*

*(f) seat electronics circuitry coupled to the distribution system for demodulating, decoding and D/A converting the modulated and encoded signals into signals that are provided to said each passenger's seat,*

*wherein the receiver does not perform any decoding and does not perform any D/A converting of the downconverted RF signals obtained from the antenna controller.*

*11. The system of claim 10, wherein the control signals are based on one of a GPS and an aircraft navigation system, and are not based on any signals output from the receiver.*

*12. A method of providing a plurality of programming channels obtained from at least one satellite, to a plurality of passengers on an aircraft, said method comprising:*

*steering an antenna towards the at least one satellite;*

*downconverting encoded RF signals transmitted by the at least one satellite to provide encoded, polarized RF signals that correspond to a plurality of encoded programming channels;*

*processing the downconverted encoded RF signals to provide encoded video and audio output signals corresponding to the plurality of programming channels;*

*modulating the encoded video and audio signals;*

*distributing the modulated and encoded video and audio signals to a plurality of passenger seats;*

*receiving the modulated and encoded video and audio signals at each of the plurality of passenger seats; and*

*at the plurality of passenger seats, demodulating, decoding and D/A converting the modulated and encoded video and audio signals into signals that may be viewed and heard by a passenger at a seat,*

*wherein no decoding and no D/A converting are performed by the downconverting step, the processing step, the modulating step, the distributing step, and the receiving step.*

* * * * *